United States Patent Office 3,752,650
Patented Aug. 14, 1973

3,752,650
DURABLE PRESS TREATMENT OF CELLULOSIC TEXTILES EMPLOYING A POLY-HYDROXY MONOCARBOXYLIC ACID CATALYST
Kurt Joss, Bergli, Weesen, St. Gall, and Ernst Ruedi, Wartegg, Ennenda, Glarus, Switzerland, assignors to Burlington Industries, Inc., Greensboro, N.C.
No Drawing. Continuation of abandoned application Ser. No. 613,435, Feb. 2, 1967. This application Oct. 15, 1970, Ser. No. 81,160
Claims priority, application Switzerland, Feb. 7, 1966, 1,655/66; June 1, 1966, 7,981/66
Int. Cl. D06m *13/12, 13/34*
U.S. Cl. 8—183                  6 Claims

ABSTRACT OF THE DISCLOSURE

A process for providing a durable press finish on a cellulosic textile using, as the catalyst, a mono- or poly-hydroxymonocarboxylic acid which has at least one hydroxy group in the γ- or δ-position and forms a nonvolatile lactone upon removal of water, a dicarboxylic acid which forms an inner anhydride or an α-hydroxy monocarboxylic acid which forms a lactide on removal of water. This makes it possible to avoid undesired premature curing of the textile since the catalyst is converted to an essentially inert form on drying, the catalyst being reformed when curing is desired.

---

This application is a continuation of Ser. No. 613,435, filed Feb. 2, 1967, and now abandoned.

The invention relates to the treatment of cellulosic materials. More particularly, the invention is concerned with the finishing of cellulosic textiles for the purpose of imparting thereto improved wrinkle resistance, durable press characteristics and other desirable properties.

The finishing of cellulosic textiles, such as fibers, yarns, and woven or non-woven fabrics, with thermosetting resins or crosslinking compounds is well known. Usually, this is accomplished by impregnating the textile with an aqueous solution or dispersion of thermosetting resin precondensate or crosslinking compound or reactant in the presence of an acid or potentially acid catalyst such as a salt of a weak base and a strong acid. The textile is then dried to a desired moisture content and cured to effect condensation of the resin or cross-linking, depending on the finishing component employed, using elevated temperatures up to about 180° C. Typical precondensates of thermosetting resins suitable for use as described include, for example, methylol urea compounds, methylol thiourea compounds, melamine and the like. Representative crosslinking compounds which may be used are the methylol compounds of cyclic urea derivatives such as glyoxal monoureine, ethylene urea, propylene urea or the like.

In these procedures an essentially uncontrollable decrease in pH occurs during curing due to the increased temperature employed. Concomitantly therewith, hydrolytic degradation of the cellulose often takes place as a result of undesired side reactions. Such degradation is accompanied by a decrease in the average degree of polymerization in the cellulose with undesirable loss in strength characteristics.

Because of the undesirable effects resulting from the use of acid catalysts, numerous special techniques or alternatives have previously been proposed but each of these suffers from one disadvantage or anothher. For example, it has been suggested that only slightly acidic compounds might be used as catalyst such as carboxylic acids, quaternary ammonium salts, amine halides and the like. However, by using such compounds, those agents which are difficult to cure, e.g. the reactive resins, are catalyzed only to an inadequate degree and the finishing thus obtained is unsatisfactory.

Another process which has been proposed involves impregnating a fabric with a solution of a precondensate of a reactive resin and mineral acid, followed by rolling up the wet fabric and maintaining it in this state during several hours at room temperature. As an alternative, it has also been suggested that the impregnated fabric might be dried to a residual humidity of 5 to 20% and then stored for several hours in this condition. However, both of these proposals suffer from serious disadvantages. In the first, only the wet crease recovery is improved, whereas in the second instance, due to over-drying of the web, hydrolytic degradation of the fiber material may take place. A further disadvantage in both processes is that they cannot be carried out continuously.

It is known that cellulosic fabrics may be permanently creased, as for example, in the case of durable press garments by pressing the goods prior to the final curing step in procedures of the type referred to above. Unfortunately, however, with the catalyst which are conventionally employed, a progressive curing takes place as the dried fabric stands in storage and, in the circumstances, desired creases or final garment shape must be pressed in as soon as possible after drying the impregnated material. Additionally, the conventional catalyst under the conditions of the press and during subsequent curing, often give rise to considerable damage to the cellulose fibers. This effect is especially pronounced in durable press operations since in these operations the amounts of resin and/or crosslinking agent and catalyst are multiples of the amounts normally used in the treatment of cellulosic textiles for improving crease recovery as, for example, in the preparation of wrinkle resistant flat goods.

One method of preparing a permanently shaped garment is described in U.S. Pat. 2,974,432. This method involves impregnating the cellulosic fabric with a solution of a synthetic resin, subsequently drying to a moisture content of 2 to 8% without polymerizing or curing the resin, making a garment from the thus dried fabric, pressing the garment to insert the desired creases therein and only thereafter curing the resin at elevated temperature. The published Swiss patent application No. 2,526/61 also describes a process for the manufacture of creaseproof ready-made textile articles in which a cellulose fabric is impregnated with a solution of a precondensate of reactive resin and latent catalyst for the crosslinking reaction, such as $MgCl_2$, zinc fluoroborate or magnesium perchlorate, after which the textile is squeezed and dried carefully at temperatures below 80° C. By this method, up to 70% of the crosslinking agent is fixed washfast. However, it is very difficult, as well as uneconomical, to dry the impregnated material under conditions such that no substantial fixation of the resin occurs and curing takes place only in a limited way so that the fabric may still be effectively pressed and cured only after sewing into garments. This difficulty is not overcome by any of the above processes.

The principal object of the present invention is to provide a process for finishing cellulosic textiles of the type indicated which is free from the disadvantages noted above. A more specific object of the invention is to provide a cellulosic fabric which has been impregnated with a textile resin precondensate, crosslinking agent or the like and dried and can be stored as desired without losing its durable press properties with the result that the fabric can be subsequently sewn into a garment, pressed and cured to give a durable press garment of improved strength and optimum characteristics. Other objects will also be apparent from the following detailed description of the invention.

Broadly stated, the present invention improves on prior procedures for finishing cellulosic textiles which involve the steps of impregnating the textile with a solution or dispersion of thermosetting resin precondensate and/or crosslinking compound or reactant in the presence of a catalyst, followed by drying and curing when desired, the improvement involving the use of a catalyst selected from the group consisting of mono- and poly-hydroxymonocarboxylic acids which have at least one hydroxy group in the γ- or δ-position and form non-volatile lactones upon removal of water; dicarboxylic acids which form inner anhydrides and α-hydroxy monocarboxylic acids which form lactides. It has been found that the use of these catalysts gives outstanding finishing effects while at the same time avoids any substantial hydrolytic degradation of the cellulose. On drying, the catalyst is converted to non-volatile lactone, inner anhydride and/or lactide depending on which catalyst is employed from the group indicated. The lactones, inner anhydrides and lactides are essentially inert, i.e. they do not tend to bring about curing. Accordingly, it is possible to store the dried textile for as long as desired without prior art problems of premature curing. At the same time, however, the addition of water converts the lactones, anhydrides and lactides into the acid form so that curing may be effected as desired.

As noted above, it has been found that use of the indicated acid catalysts which are capable of forming lactones, inner anhydrides or lactides in the presence of water, makes it possible to store fabric which has been impregnated and dried until the final curing step is desired. The resulting products show a substantially decreased loss of strength during press and curing in comparison to products treated by prior procedures. It has also been observed that with suitable choice of pressing conditions, complete curing and fixation of the desired shape may be obtained in the pressing operation so that the textile after pressing needs no further heat treatment.

With the fabric of the invention it is possible to use conventional drying conditions, i.e. usual drying temperatures up to 150° C. Under these conditions, a portion of the resin or reactant is fixed permanently on the textile during drying. However, after this treatment, the fibers are still deformable so that treated fabric, for example, may be thereafter pressed in garment shape and permanently fixed by a heat treatment. The water necessary to obtain the catalytically active acid from the lactone, anhydride or lactide is obtained from the crosslinking reaction and/or resin condensation. Accordingly, it is not necessary to adjust the fabric to a defined moisture content, or to supply steam during the pressing. The the amount of liberated acid corresponds with the amount of acid needed for catalyzing the crosslinking reaction and hydrolytic damage of the cellulose by excessive acid, as occurs with the conventional metal salt or ammonium salt catalysts, is prevented.

A further advantage of the fabric of the present invention resides in the fact that dyestuffs fixed thereon during any heat treatment are subject to much less attack and change than when using metal or ammonium salt catalysts.

As a more specific illustration of the processing of cellulose fabric according to the invention, the cellulose fabric may be impregnated with an aqueous solution containing the resin precondensate or crosslinking compound or reactant and a corresponding γ- or δ-hydroxy monocarboxylic acid or a corresponding dicarboxyilc acid. The drying may be effected at relatively high temperatures, e.g. up to 140° C., so that the drying operation may be effected at high velocity. Over-drying of the impregnated fabric is not disadvantageous or noxious since the water necessary for forming the acid from the lactone (or anhydride or lactide, as appropriate) is provided by the crosslinking and/or condensation reaction as noted earlier.

Preferably the drying step is conducted in such a manner that partial condensation of the resin occurs, by which the resin becomes insoluble but not yet rigid or completely cured. After this drying, the fabric does not shrink during hot pressing, and moreover, a notably smaller amount of formaldehyde evolves during pressing than when processing known materials. The fabrics of the present invention are storable for practically unlimited periods of time, since no curing takes place during normal storage as noted earlier. Since the catalyst during this time is not present in its active form, but in form of a precursor, the damage caused by the usual catalysts, e.g. $MgCl_2$ does not occur.

Preferably acids having 4 carbon atoms are used as the catalyst herein. The mono- and dicarboxylic acids may be substituted by further hydroxy and/or oxo groups. Suitable acids are e.g. lactone-forming α-keto-, γ- or δ-hydroxy carboxylic acids and α-hydroxy dicarboxylic acids such as malic acid. Suitable dicarboxylic acids forming inner anhydrides are maleic, succinic and phthalic acid.

The concentration of the potentially acidic catalyst in the treating bath should be at least 10 grams/l. of the bath, and preferably at least 50 grams/l. As noted, the catalytic action of the acids employed is at least partially blocked during the drying of the fabric and again comes into force only when during the condensation and/or crosslinking of the cellulose water is set free, so that hydrolytic degradation of the cellulose is substantially prevented.

The invention is illustrated, but not limited, by the following examples:

EXAMPLE 1

Cotton-cretonne pretreated in conventional manner (warp 22/ ¼ inch, Ne 20/1; weft 15/ ¼ inch, Ne 50/2) was impregnated with an aqueous solution containing 250 grams/l. of dimethylol-dihydroxyethylene urea 40 grams/l. of polyethylene plasticizer emulsion, 20 grams/l. of octadecyl ethylene urea (plasticizer), 160 grams/l. of glucuronic acid (50%).

The fabric was squeezed to a pick-up value of 60% and then dried on a tenter frame to a moisture content of about 6% (air temperature 140 to 150° C.). From this fabric leg portions of trousers were sewn and pressed for 30 sec. at 175° C. and .6 kg./cm.$^2$. Some of the pressed articles were post-cured in a drying oven during 20 min. at 165° C.

After repeated laundering in a machine the creases were still excellent and the remaining parts as well as the seams were smooth.

EXAMPLE 2

Cotton poplin was used in this example. It was impregnated with the following aqueous solution:

| | Grams/l. |
|---|---|
| Propylene urea precondensate | 300 |
| Non-ionic wetting agent | 2 |
| Glucuronic acid | 80 | and squeezed to a pick-up of solution of 60%. The wet fabric was wound up, wrapped in a polyethylene foil and stored for one hour at 98° C. Then the fabric was washed, neutralized and dried.

The tear and tensile strength of the finished product were substantially the same as the corresponding properties for the untreated fabric. The dry crease recovery angle was slightly increased, and the wet crease recovery angle as well as the wash-wear-properties were markedly improved.

It will be recognized that the term "cellulosic textile" as used herein is intended to cover any conventional form of cellulosic textile including, for example, fibers, yarns and fabric, woven or non-woven. These textiles may be made up entirely of cellulose or may comprise blends thereof with other textiles, e.g. polyester.

Any textile finishing resin or reactant which is conventionally applied to cellulosic textiles by impregnation, drying and curing in the presence of a catalyst for the purpose of providing a durable crease or press or wrinkle-resistant properties, may be used in the present invention. This includes, without limitation, the methylol derivatives of urea, thiourea and melamine, and cyclic ureas such as ethylene urea, propylene urea, glyoxal monoureine and the like.

In the case where durable press garments are made according to the invention, curing may be accomplished on the press, after sewing and shaping into garments, at elevated temperatures and pressures of preferably more than 150° C. and 0.3 kg./cm.$^2$, respectively.

The scope of the invention is defined in the following claims wherein:

1. In the finishing of a cellulosic textile to provide a durable press wherein the textile is impregnated with an aqueous solution of an aminoplast durable press textile resin procondensate or reactant and a catalyst, and the textile is thereafter dried, pressed and cured with storage of said textile after drying but before pressing and curing, the improvement whereby undesired curing during storage is minimized which comprises utilizing, as the catalyst, a catalytically effective amount of a poly-hydroxymono-carboxylic acid having six carbon atoms and at least one hydroxy group in the γ- or δ-position and which forms a nonvolatile lactone upon removal of water, in aqueous solution wherein the concentration of the acid is at least 10 grams per liter, the catalyst being converted to an inert state on drying, drying at a temperature of up to 150° C. to effect said conversion and thereafter pressing and curing, the catalyst being reconverted during the curing step by heating in the presence of moisture at a temperature higher than the drying temperature to complete the cure as desired.

2. The process of claim 1 wherein after drying, the textile is made into a garment, pressed and cured.

3. The process of claim 1 wherein after drying, the textile is made into a garment, pressed and post-cured.

4. The process of claim 1 wherein pressing and curing are carried out together.

5. The process of claim 4 wherein the garment is cured in the press at a temperature of more than 150° C. and a pressure of more than 0.3 kg./cm.$^2$.

6. The cellulosic textile obtained by the process of claim 1.

References Cited
UNITED STATES PATENTS

| 2,950,553 | 8/1960 | Hurwitz | 38—144 |
|---|---|---|---|
| 3,434,794 | 3/1969 | Tovey | 38—144 X |
| 3,518,043 | 6/1970 | Petersen et al. | 38—144 X |
| 3,080,281 | 3/1963 | Fischer et al. | 8—116.3 X |
| 3,441,367 | 4/1969 | Pierce et al. | 8—116.3 |
| 3,533,728 | 10/1970 | Shippee et al. | 8—116.2 |
| 3,165,374 | 1/1965 | Hushebeck | 8—116.4 |
| 2,108,520 | 2/1938 | Wolf et al. | 8—116.3 X |

FOREIGN PATENTS

| 4,595 | 6/1962 | Japan | 8—116.3 |
|---|---|---|---|

OTHER REFERENCES

Fieser et al.; Advanced Organic Chemistry; 1961; pp. 392, 460—461.

NORMAN G. TORCHIN, Primary Examiner

J. R. MILLER, Assistant Examiner

U.S. Cl. X.R.
8—116.3; 38—144